S. D. REYNOLDS.
Improvement in Road Dresser.

No. 121,129.

Patented Nov. 21, 1871.

Witnesses:
Chas. Nide.
Francis McArdle.

Inventor:
S. D. Reynolds
Per
Attorneys.

UNITED STATES PATENT OFFICE.

SAMUEL D. REYNOLDS, OF ROCHELLE, ILLINOIS.

IMPROVEMENT IN ROAD-DRESSERS.

Specification forming part of Letters Patent No. 121,129, dated November 21, 1871.

*To all whom it may concern:*

Be it known that I, SAMUEL D. REYNOLDS, of Rochelle, in the county of Ogle and State of Illinois, have invented a new and useful Improvement in Road-Dresser; and I do hereby declare that the following is a full, clear, and exact description thereof, which will enable others skilled in the art to make and use the same, reference being had to the accompanying drawing forming part of this specification.

Figure 1:
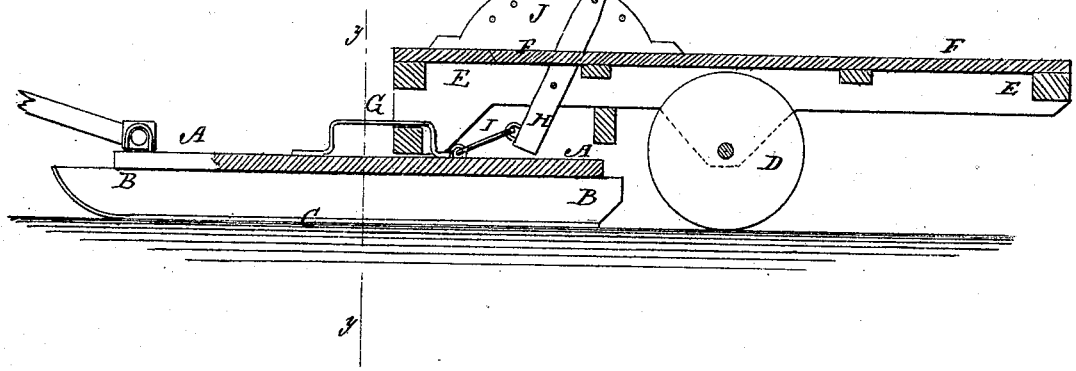
Figure 2:
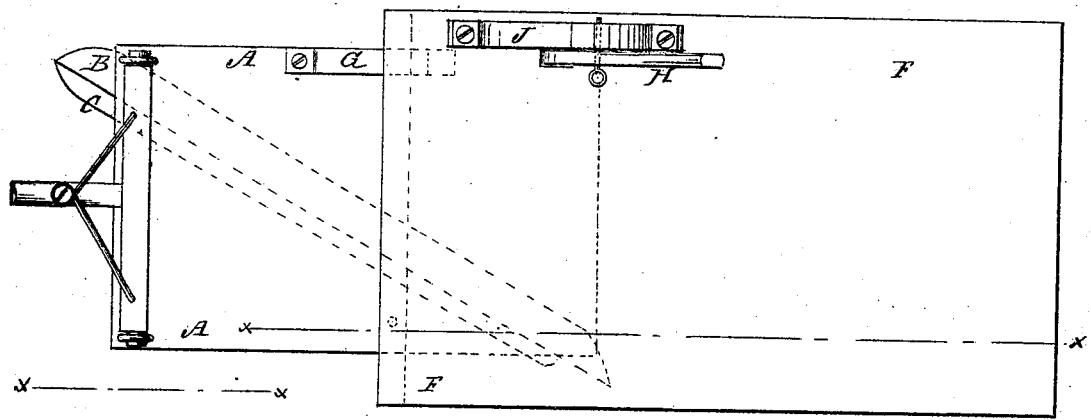
Figure 3:
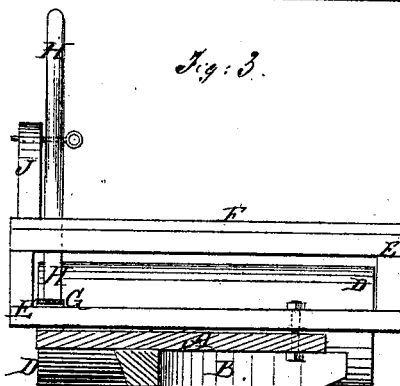

Figure 1 is a side view of my improved machine, partly in section, through the line $x\ x$, Fig. 1. Fig. 2 is a top view of the same. Fig. 3 is a detail cross-section of the same taken through the line $y\ y$, Fig. 2.

Similar letters of reference indicate corresponding parts.

My invention has for its object to furnish an improved machine for dressing roads, filling the ruts made by the wagon-wheels, and rolling down the dirt, and which shall be so constructed as to hold itself to its work even upon inclined or sideling roads; and it consists in the construction and combination of the various parts of the machine, as hereinafter more fully described.

A is the forward platform of the machine, to the forward end of which the draft is attached, and to the under side of which are attached one, two, or more timbers, B, in an inclined position, as shown in Fig. 2. To the lower sides of the timbers B are attached the plates C, the forward edges of which project in front of the forward sides of the said timbers B to act as scrapers to scrape off the rough places of the road, the inclination of the timbers B causing the dirt scraped up by the plates C to move along the said timbers B toward the center of the road, filling the ruts and hollows formed in the road, the balance of the dirt being left in the center of the road. If desired, the plates C may be attached to the sides of the timbers B. D is a roller, the journals of which revolve in bearings in the side bars of the frame E of the rear platform F. The lower front cross-bar of the frame E, near one end, is hinged to the middle part of the platform A, and the said cross-bar, near its other end, passes through a keeper, G, attached to the said platform A. This construction enables the roller to be adjusted at a greater or less angle with the length of the platform A, as may be required to hold the scrapers against their tendency to slide, and to hold them up to their work upon an inclined or sideling roadway. To the forward part of the frame E, upon the same side as the keeper G, is pivoted a lever, H, the lower end of which is connected with the platform A, near its side edge, by a rod, I, as shown in Fig. 1. The levers H project upward along a semicircular block, J, or curved arm attached to the platform F, and which has a series of holes formed in it, as shown in Fig. 1, to receive a pin, which also passes through the said lever H to secure the roller at any desired angle with the platform A.

With this construction the driver stands upon the platform F, and by stepping toward the front part of the platform F he throws all his weight upon the scraper, and by stepping toward the rear part of the platform F he can throw all his weight upon the roller D; or, by stepping still further toward the rear end of the said platform F he can make his weight overbalance the weight of the scraper so as to raise the said scraper from the roadway, enabling him to use only the roller and to drive along the road without scraping.

Having thus described my invention, I claim as new and desire to secure by Letters Patent—

1. The combination, in a road-dresser, of inclined timbers B and plates C, attached and operated together in the manner and for the purpose specified.

2. The scraper-platform A having keeper G combined, as described, with the roller-platform frame E, hinged to the middle thereof, to enable the roller to be adjusted at different angles.

3. The combination of the roller and scraper-frames, when the former projects over and is attached near the middle of the latter, as described, to enable the driver to bring his weight to bear in the manner and for the purpose specified.

SAMUEL D. REYNOLDS.

Witnesses:
 F. F. HIMEBAUGH,
 GEORGE AMBROSE. (51)